: 3,020,544
PASSIVE RADIO FREQUENCY DETECTION
APPARATUS AND METHOD
Hanns H. Wolff, Matawan, N.J., assignor to Maxson
Electronics Corporation, a corporation of New York
Filed Jan. 23, 1959, Ser. No. 788,643
10 Claims. (Cl. 343—100)

The present invention relates to a method and apparatus for surveying the earth's surface by sensing extraterrestrial radio frequency radiation reflected from the earth.

It is possible to use reflection of extraterrestrial radio frequency radiation for surveying portions of the earth's surface containing dissimilarities or discontinuities in reflection coefficients. For example, discontinuities on the ground can be detected from an aircraft by measuring the reflected energy originating in extraterrestrial space. The frequencies which are especially suited for such a surveying system are high micro-wave frequencies, especially in the 70 kmc. range.

The main difficulty in making such measurements is that this energy is almost exclusively in the form of noise and its intensity or energy is extremely small. The problem therefore is to measure a small noise energy, and since all electronic equipment has inherent noise of considerable intensity, it is necessary to separate the "signal noise" from the "equipment noise."

This problem is similar to the radiometry problem of measuring the sky radiation direct. R. H. Dickey has described (Rev. Scient. Inst. 1946, pp. 268–275) a microwave radiometer in which a lossy modulating wheel is used between the antenna and the receiver to intermittently turn off the antenna section and thereby the signal noise, and since the modulating wheel is designed to replace the antenna resistance, this system takes account, at least theoretically, of the actual receiver noise, including gain variation noise.

Other methods for radiometers have been proposed, for which a somewhat higher sensitivity is claimed, for example, a two-receiver method where the two receivers have different noise characteristics and the received signals are evaluated in a correlation system.

None of these solutions is ideal. The modulating wheel is difficult to match to the antenna and noise correlation is also only possible to a limited extent.

All these difficulties are avoided in the receiver of this invention, which is based on a different concept. The extraterrestrial radiation is mainly unpolarized. However, depending on the material from which it is reflected and the angle of incidence, a polarization takes place which makes it possible to survey the ground by polarization measurements. For this purpose, in accordance with this invention, a receiver, using a linearly polarized antenna is used, which antenna rotates with a reasonable speed, for example 1800 r.p.m. or more, with the antenna center line as an axis, and since the receiver noise (including antenna noise) is independent of the antenna position, only the signal noise is modulated by this rotation.

According to the invention, a radio receiver for radio frequency radiation in a frequency band of about 70 kmc. is supported at a position above the earth's surface, as, for example, in a suitable aircraft. The receiver has an antenna having a preferred or optimum direction of polarization, such as a linearly polarized antenna. The antenna and preferably the receiver also are rotated at a suitable speed about its axis. The modulation of the received radiation due to the rotation of the antenna is detected and the amplitude of the detected wave is determined and sent to a suitable indicator. Thus, variations of the earth's surface causing changes in the polarization of the reflected radiation produce corresponding changes on the indicator, which may be a cathode ray tube. If desired, the peak amplitude of the modulated wave produced by the rotation of the antenna, as well as the average amplitude of the modulated wave, may be fed to the indicator and caused to produce distinguishable indications. The antenna and receiver are caused to have a desired scanning pattern, for example, spiral or linear scanning, in order to survey the desired area of the ground.

The invention will be fully understood and other objects and advantages thereof will become apparent from the following description and the drawing in which.

Figure 1:
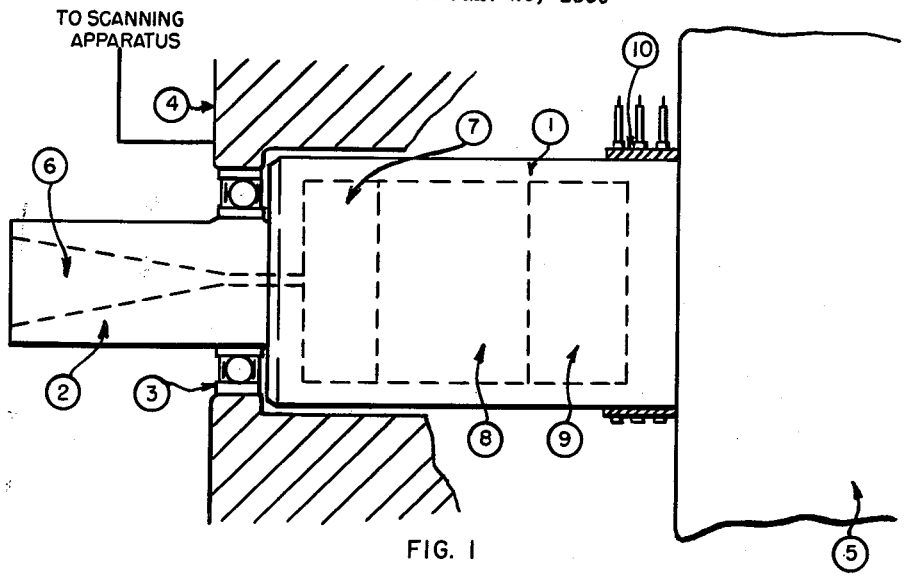
FIG. 1 is a schematic diagram of the structural configuration of the apparatus.

Referring to FIG. 1, the receiver may be enclosed in a housing 1 having a shaft 2 at one end. The housing 1 and shaft 2 are preferably mounted in ball bearings 3 in a relatively stationary structure 4. The housing 1 is connected to a motor 5 for rotating the housing 1 and shaft 2 at a suitable speed of, say, 1800 r.p.m. The casing of the motor may be integral with the mounting 4. The shaft 2 is provided with any antenna 6 for receiving linearly polarized radiation. The antenna may be a suitably dimensioned sectoral horn. The output of the antenna 6 may be fed to a mixer 7 and I.F. amplifier 8 and suitable detection apparatus 9, the output of which is connected through slip rings 10 to output conductors 11, as will be described more fully in connection with FIG. 2. As already mentioned, the entire apparatus may be supported in a suitable aircraft. Apparatus may be provided for moving the axis of the receiver and the antenna so that it can scan a desired area of the earth's surface, for example, by moving the axis spirally or linearly back and forth or in any other sutiable way. If the apparatus is airborne, the whole system may be carried by a stabilized platform and controlled by the aircraft movements to produce a steady representation on the indicator, and the receiver may be mounted in a gimbal system on the platform in a manner well understood in such systems.

Figure 2:
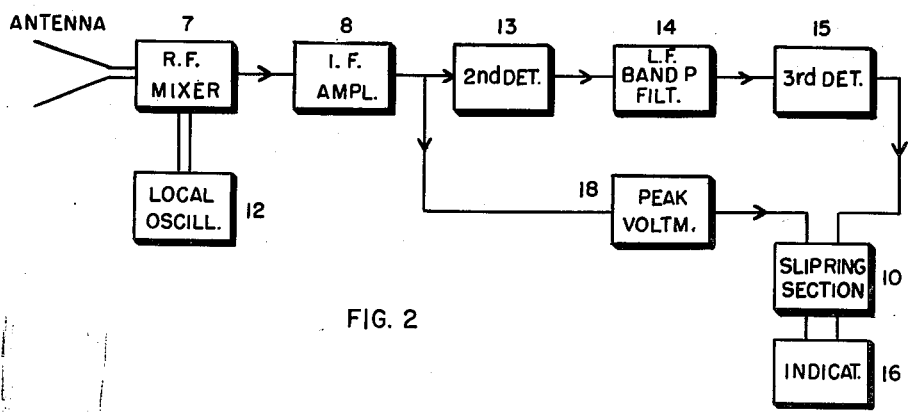
FIG. 2 is a block diagram of the radio receiver and indicator.

FIG. 2 shows the antenna 6 connected to the radio frequency mixer 7 which may be supplied by a local oscillator 12. The intermediate frequency output of mixer 7 is fed to intermediate frequency amplifier 8 and then to a second detector 13. Since the antenna 6 receives in any one position, a signal substantially identical to the signal received when the antenna is rotated 180°, two modulation cycles occur for each rotation of the antenna. Thus the modulation frequency, in cycles per minute, is numerically double the r.p.m. of the antenna. The modulation frequency, in cycles per second, is numerically $2/60$ or $1/30$ of the r.p.m. of antenna rotation. The output of the second detector is basically of a frequency which is numerically $1/30$ of the r.p.m. of the receiver and antenna rotation. The output modulation frequency of second detector 13 has an amplitude which is determined by the reflecting material and the angle of incidence of the extraterrestrial radiation on point on the earth's surface from which the radiation is being received. This modulation frequency is then fed into a low-frequency band pass filter 14, which passes the modulation frequency. The output of filter 14 is rectified in a third detector 15. The output of detector 15 has an amplitude corresponding to the average value of the modulation frequency due to the rotation of the antenna and this output is fed to an indicator 16 through the slip ring arrangement 10.

Since different reflecting materials may give, under a given incidence angle, the same amplitude difference between vertical and horizontal polarization, the indicator might show little or no discontinuity between such different reflecting materials, for the output of the third detector 15 might have a minimal value under such conditions. In general, however, in such a case the average amplitude and the maximum amplitude of the reflected energy are different and allow a discrimination from the output of the third detector. The average or maximum amplitude of the received radiation may be measured, for example, by a rectifier with a long time constant or peak voltmeter 18, the output of which is connected to the indicator 16. The output of peak voltmeter 18 can be used for example to control the color of a color picture tube constituting the indicator 16, whereas the output of the third detector 15 may be used to control the intensity, or vice versa.

Figure 3:
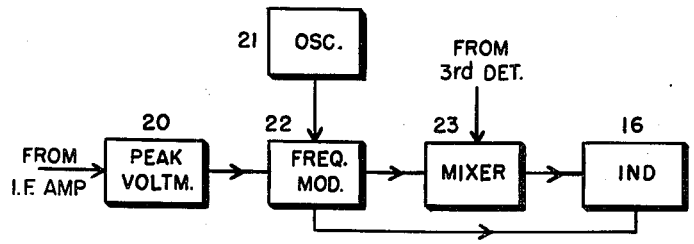
FIG. 3 is a block diagram of a modification of FIG. 2.

Instead of using a color picture tube to provide additional discrimination, the arrangement shown in FIG. 3 may be used. The peak voltmeter 20 is connected to the output of the intermediate frequency amplifier 8 and this output is used for modulating the frequency of oscillator 21 by a frequency modulator 22. The modulated frequency of oscillator 21 is fed to a mixer 23 to which the output of the third detector 15 is also supplied. The amplitude of the signals supplied to the mixer 23 may be such that the mixer acts as an on-off switch for the control voltage coming from the third detector. The indicator 16 connected to the mixer 23 in this case may be an ordinary cathode ray tube indicator, instead of a color tube. Thus the modulating frequencies supplied to indicator 16 provides an additional representation of different materials, when such materials might fail to be discriminated at the output of detector 15. The scanning frequency of indicator 16 should be synchronized with the modulating frequencies supplied from oscillator 21 and frequency modulator 22. The indicator 16 may include a recorder for making a photographic or other permanent continuous record.

In general, the scanning speed will be comparatively slow and, therefore, it is necessary to use long persistence screens in the indicator tube.

Since somewhere between the rotating antenna and the stationary indicator an energy transfer from the rotating equipment section to the stationary equipment section has to be accomplished and such a transfer mechanism is another source of noise, the transfer point has to be carefully selected. From the standpoint of noise, preferably all but the indicator proper are arranged in the rotating section.

Although I have described the particular embodiments of my invention for illustrating the principles thereof, it will be understood that many variations and modifications thereof can be made without departing from the invention. The invention, therefore, is not to be construed as limited except as defined in the following claims.

I claim:

1. The method of surveying the surface of the earth, comprising the steps of receiving at a position above the earth its reflections of extraterrestrial radio frequency radiation, sensing the angular direction of polarization of the received reflected radiation, producing an electrical output corresponding in amplitude to the variations in polarization, and producing an indication of the electrical output as a representation of a characteristic of the earth's surface.

2. The method according to claim 1 wherein radiation in the range of 70 kmc. is received.

3. The method according to claim 2 including the step of scanning the given area of the earth's surface.

4. The method according to claim 1 including the step of determining the peak amplitude of the received radiation as well as the variations of the received radiations with directions of polarization and indicating the peak amplitude and the polarization variations of the received radiations.

5. The method according to claim 1 including the step of determining the average amplitude of the received radiation as well as the variations of the received radiations with the direction of polarization and jointly indicating said average amplitude and the polarization variations.

6. Apparatus for surveying the earth's surface comprising a polarization sensitive antenna directed for receiving radiation from said surface, means for continuously rotating said antenna about an axis perpendicular to the directions of polarization, a radio receiver connected to said antenna, said receiver including means for detecting a modulation frequency of the received radiation from said surface proportionate to the rate of rotation of the antenna and means for indicating the amplitude of said modulation frequency.

7. Apparatus according to claim 6 including means for detecting the peak amplitude of the received radiation and varying the indications on said indicator in accordance with said peak amplitude.

8. Apparatus according to claim 6 including means for detecting the average amplitude of the received radiation and for varying the indications of said indicator in accordance with said average amplitude.

9. Apparatus according to claim 6 including a peak voltmeter, an oscillator, said peak voltmeter being connected to a point in said receiver ahead of said detector, means connected to the output of said peak voltmeter for varying the frequency of said oscillator and means for supplying the variable frequency oscillations of said oscillator to the indicator for varying the indication thereof in accordance with the peak amplitude of the received radiation.

10. Apparatus according to claim 6, wherein said receiver is connected to said antenna for rotation therewith.

References Cited in the file of this patent

UNITED STATES PATENTS

| | | |
|---|---|---|
| 2,458,654 | Southworth | Jan. 11, 1949 |
| 2,483,790 | Stanko | Oct. 4, 1949 |